Patented June 29, 1926.

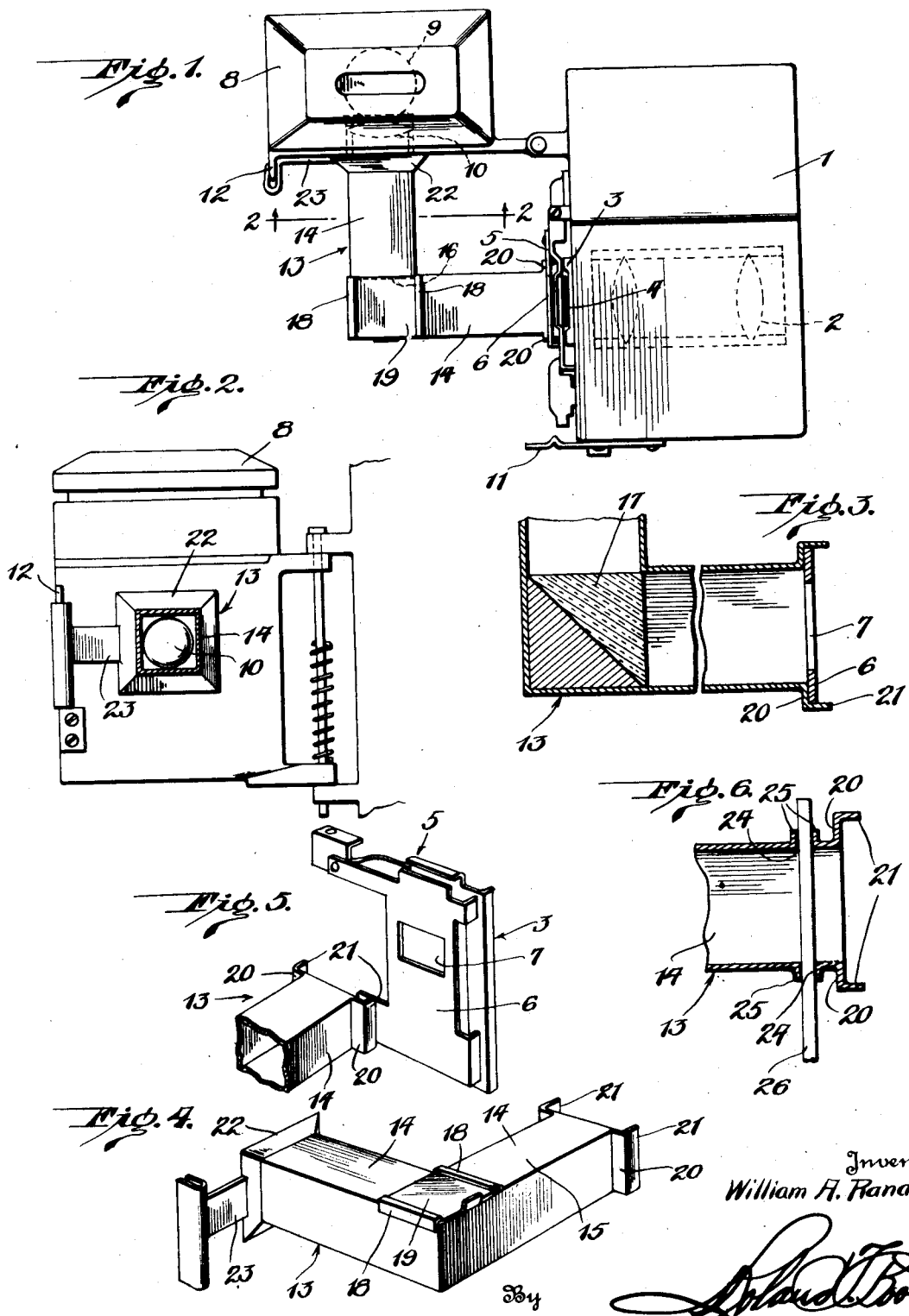

1,590,254

UNITED STATES PATENT OFFICE.

WILLIAM A. RANDALL, OF ATLANTIC CITY, NEW JERSEY, ASSIGNOR OF ONE-HALF TO ADAM FREUND AND HENRY FREUND, BOTH OF ATLANTIC CITY, NEW JERSEY.

ATTACHMENT FOR MOTION-PICTURE MACHINES.

Application filed March 21, 1924. Serial No. 700,885.

This invention relates to attachments for moving picture machines, and particularly to an attachment for projecting any picture of a movable strip while the strip is stationary.

An object of the invention resides in providing an attachment of the character above described, wherein the structure of the machine is utilized for mounting the same, so that the light from the lamp house may be utilized for projecting any picture of the movable film while the film is stationary with the automatic shutter open, and without danger of burning the film.

Another object of the invention resides in providing an attachment for projecting the light from the lamp house through the film mounted in the same guide and through the same projector and lens as when projecting moving pictures, and at the same time eliminating the heating of the film strip and permitting the projection of any single picture of the strip while it is stationary for use when lecturing or for making photographic enlargements.

A further object of the invention is to provide an attachment of the above character specifically adapted for use in connection with a type of motion picture machine well known in the art, wherein the lamp house is movable relative to the film guide and projecting lens on a hinge to a position substantially at right angles thereto, so that the attachment may be removably inserted between the lamp house in this open position and the film guide for projecting the light at right angles to the normal direction of projection from the lamp house and through the main projecting lens for projecting the pictures of the film while stationary onto a suitable screen for use in lecturing and advertising to permit any picture of the strip to be viewed continuously any desired length of time without danger of burning the strip.

The invention includes other objects and advantages in the details of construction and arrangement of the parts which are more particularly pointed out in the following description and claims directed to a preferred form of the invention, it being understood, however, that variations may be made in the specific manner of application and construction of the invention without departing from the spirit and scope of the same as described and claimed.

In the drawings forming a part of the application;

Figure 1 shows a plan view of the invention in operative position on a motion picture machine.

Figure 2 shows a sectional view on line 2—2 of Fig. 1.

Figure 3 is a horizontal sectional view showing the manner of fitting the invention to the film guide.

Figure 4 is a perspective view of the attachment per se.

Figure 5 is a disassembled perspective view of showing the manner of fitting the invention to the film guide.

Figure 6 is a horizontal fragmentary section through one end of the tubular member showing the mounting for a slide.

1 indicates the housing of a motion picture machine, of a character well known in the art, wherein the lens mounting indicated at 2 cooperates with the opening in the film guide 3 to form a projection passage for the pictures of a film strip 4 movable through said guide. The film guide 3 includes a hinged section 5 having an outer or rear plate 6 provided with an opening 7 for the passage of light from the source through the film for projecting a motion picture. A lamp house 8 is hingedly mounted at the rear side of the housing and carries an electric lamp 9 forming a source of light supply. The lamp house mounts a concentrating lens 10 in the forward face thereof for concentrating the light for properly illuminating the projected picture when the lamp house is positioned with the forward face in substantial contact with the film guide and housing. In this position of the lamp house the motion picture may be projected through the projection passage on to a suitable screen in a well known manner, a suitable automatic shutter cutting the light off from projection though the film when the speed thereof reduces below a predetermined minimum for preventing fire.

In applying and removing the film from the guide, the lamp house is swung on the hinges to the position shown in Fig. 1 in order that the hinged section 5 may be opened, at which time the light from the lamp house is projected at right angles to the axis of projection during the projection of a motion picture. A spring catch 11 mounted on the housing engages a projection 12 on the lamp house for holding the lamp house in position for projecting a motion picture as above described.

The light projecting member forming the subject matter of the present invention includes a tubular member 13 of substantially square cross section including angularly arranged sections 14, the top wall 15 of which is formed at the juncture of the angular sections with an opening 16 for permitting the insertion of the reflecting prism 17. The member is formed with suitable guides 18 at opposite sides of the opening 16 for removably and slidably receiving a cover section 19. The prism may be made in any suitable manner and secured in the member by any desirable means known in the art, so that light projected through the axis of one of the sections will be reprojected by the prism through the other section. The end of one of the sections 14 is formed with extensions 20 from opposite sides provided with laterally extending ends 21 adapted to embrace the sides of the rear plate 6 of the film guide in order to accurately position the member with the section 14 in proper alignment with the projection passage and the opening 7. The other angular section is provided with a flared end portion 22 from one side of which projects an arm 23 having a spring clip formed at the end for engagement over the projection 12 on the lamp house. The clip will mount the member with the flared end over the concentrating lens 10 in engagement with the front face of the lamp house.

If desired, the section 14 may be provided with a slot 24 in opposite sides having projecting lips 25 for guiding a slide member 26 adapted for carrying slides to color the light and produce novel effects thereon in a well known manner.

The member 13 is readily detachable from connection with the lamp house and film guide, and is applied as shown in Fig. 1 with the lamp house in position at right angles to the housing of the machine so that the prism in the member will reflect the light through the film for projecting one of the pictures of the film while it is stationary. This can not be accomplished under the ordinary use of the lamp house as the heat will burn the film, an automatic shutter being provided in the machine for cutting off the light below a predetermined speed of the picture.

It will therefore be apparent that a simple, inexpensive, and novel attachment has been provided for a motion picture machine for projecting the light from the lamp house through the film when stationary for projecting a single picture on the film. The attachment also absorbs and radiates the heat from the light rays to prevent overheating and burning of the film and for permitting the projection of cooled light on to the film strip.

What is claimed is:

1. An attachment for motion picture machines wherein the machine includes a housing, a film guide mounted thereon, and a lamp house movably mounted on the body and adapted in one position to project light through said film guide for projecting a motion picture and in another position in spaced relation to the guide and housing to project light at an angle to the first mentioned line of projection, comprising means interposed between the lamp house and film guide for projecting the light from the lamp house in the last mentioned position through the film guide for projecting a picture, and adapted to dissipate the heat of the light to prevent excessive heating of the film.

2. An attachment for motion picture machines, wherein the machine includes a housing, having a film guide for a movable film and a projection passage in line with an opening in the guide, and a lamp house movably mounted on the housing adapted in one position to project light through the projection passage for projecting a moving picture and to be moved to another position in spaced relation to the housing, comprising a tubular member removably attached to said lamp house and film guide for holding said lamp house and guide fixed in the last mentioned relation and having means for directing the light projected from the lamp house through the film, guide, and projection passage and eliminating heat projection to the film, whereby any picture of the movable film may be projected while the film is stationary.

3. An attachment for motion picture machines, wherein the machine includes a housing, having a film guide for a movable film and a projection passage in line with an opening in the guide, and a lamp house movably mounted on the housing adapted in one position to project light through the projection passage for projecting a moving picture and to be moved to another position in spaced relation to the housing, comprising a tubular member formed with projections adapted for engagement with predetermined portions of the lamp house in the last mentioned position and the film guide for removably mounting said member thereon, and means carried by the member for directing the projected light from the lamp house through the film and projection passage for projecting a picture of the film strip while stationary and substantially eliminating heat projection to the film strip.

4. An attachment for motion picture machines wherein the machine includes a housing, a film guide mounted thereon, and a lamp house movably mounted on the body and adapted in one position to project light through said film guide for projecting a motion picture and in another position in spaced relation to the guide and housing to project light at an angle to the first mentioned line of projection, comprising a tubular member formed with angularly arranged sections having light reflecting means therein, said member being removably mounted between the lamp house and film guide whereby the light reflecting means will direct the light projected from the lamp house through the film guide for projecting a picture of the film while stationary.

5. In combination, a motion picture machine having a housing formed with a picture projection passage, a film guide mounted on said housing for guiding a movable picture film, and a lamp house containing a source of light movably mounted on the housing and adapted in one position to project light through the film and projection passage for projecting the pictures on the film while in motion and when moved to another position to be arranged in spaced angular relation with respect to the housing, and means interposed between the lamp house and the film guide for directing the light projected from the lamp house through the film, guide, and projection passage for projecting a picture of said film while stationary in the guide without danger of overheating said film.

In testimony whereof I affix my signature.

WILLIAM A. RANDALL.